United States Patent
Matsumiya et al.

(10) Patent No.: US 7,869,622 B2
(45) Date of Patent: Jan. 11, 2011

(54) IMAGE MEASURING SYSTEM, IMAGE MEASURING METHOD AND IMAGE MEASURING PROGRAM FOR MEASURING MOVING OBJECTS

(75) Inventors: Sadayuki Matsumiya, Sagamihara (JP); Koichi Komatsu, Yamato (JP)

(73) Assignee: Mitutoyo Corporation, Kawasaki-shi (JP)

( * ) Notice: Subject to any disclaimer, the term of this patent is extended or adjusted under 35 U.S.C. 154(b) by 1158 days.

(21) Appl. No.: 11/443,370

(22) Filed: May 31, 2006

(65) Prior Publication Data

US 2006/0274330 A1 Dec. 7, 2006

(30) Foreign Application Priority Data

Jun. 3, 2005 (JP) ............................. 2005-164601

(51) Int. Cl.
G06K 9/00 (2006.01)
G01B 11/14 (2006.01)
G01B 5/02 (2006.01)

(52) U.S. Cl. ...................... 382/108; 382/141; 356/614; 702/158

(58) Field of Classification Search .................. 382/106
See application file for complete search history.

(56) References Cited

U.S. PATENT DOCUMENTS

| | | | | |
|---|---|---|---|---|
| 6,023,680 | A * | 2/2000 | Wooster et al. | 705/7 |
| 6,161,079 | A * | 12/2000 | Zink et al. | 702/168 |
| 6,286,055 | B1 * | 9/2001 | Yamazaki et al. | 710/1 |
| 6,490,541 | B1 * | 12/2002 | Ariga et al. | 702/158 |
| 6,722,554 | B2 * | 4/2004 | Saito | 228/37 |
| 6,816,609 | B1 * | 11/2004 | Shimizu et al. | 382/151 |
| 6,950,552 | B2 * | 9/2005 | Nair et al. | 382/195 |
| 2004/0103548 | A1 | 6/2004 | Jordil et al. | |
| 2004/0109205 | A1 * | 6/2004 | Asano et al. | 358/448 |
| 2004/0156054 | A1 | 8/2004 | Christoph | |
| 2004/0188643 | A1 * | 9/2004 | Weiss et al. | 250/559.42 |
| 2005/0109959 | A1 * | 5/2005 | Wasserman et al. | 250/559.19 |

FOREIGN PATENT DOCUMENTS

| | | |
|---|---|---|
| EP | 0 532 169 A1 | 3/1993 |
| JP | A-08-101017 | 4/1996 |
| JP | A-10-123016 | 5/1998 |
| JP | A-2003-208605 | 7/2003 |
| JP | A 2004-535587 | 11/2004 |
| JP | A-2006-084444 | 3/2006 |

OTHER PUBLICATIONS

Japanese Office Action issued on Sep. 7, 2010 for Japanese Application No. 2005-164601 (with translation).

* cited by examiner

*Primary Examiner*—David P Rashid
(74) *Attorney, Agent, or Firm*—Oliff & Berridge, PLC (57) ABSTRACT

Within a prioritized mode selection dialog, either a measurement accuracy prioritized mode or a measurement speed prioritized mode is selected. If the measurement accuracy prioritized mode is selected, then processing for entering a tolerable amount of movement is executed. Then, a relative movement speed of a CCD camera to a measurement stage is calculated from the entered amount of movement. Finally, image information is captured at a lower speed than the calculated relative movement speed to execute image measurement. If the measurement speed prioritized mode is selected, then processing for entering a relative movement speed is executed, and image information is captured at the entered relative movement speed to execute image measurement.

2 Claims, 6 Drawing Sheets

IMAGE MEASURING SYSTEM, IMAGE MEASURING METHOD AND IMAGE MEASURING PROGRAM FOR MEASURING MOVING OBJECTS

CROSS REFERENCE TO RELATED APPLICATION

This application is based upon and claims the benefit of priority from the prior Japanese Patent Application No. 2005-164601, filed on Jun. 3, 2005, the entire contents of which are incorporated herein by reference.

BACKGROUND OF THE INVENTION

1. Field of the Invention

The present invention relates to an image measuring system, image measuring method, and image measuring program having a non-stop measurement mode for image measurement, in which an imaging means moves relative to a measuring object supported on a measurement stage and captures instantaneous image information at designated measurement positions without making a stop.

2. Description of the Related Art

Figure 8:
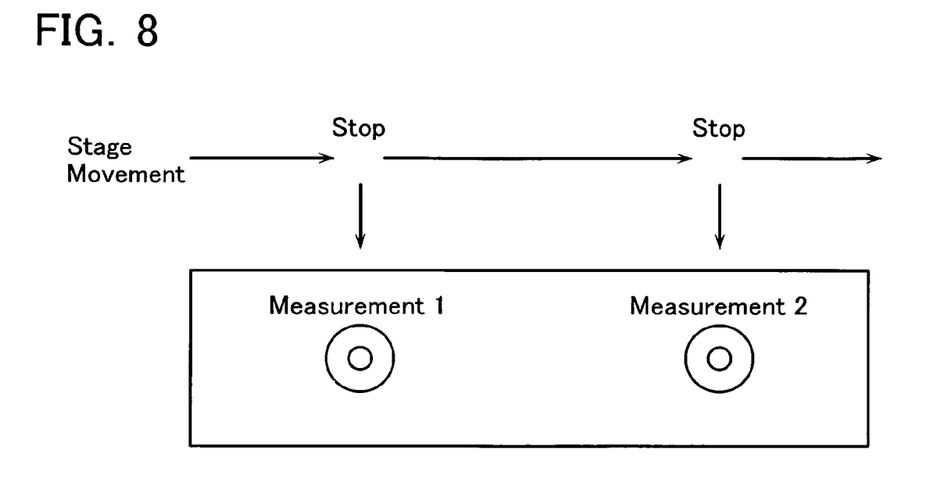
FIG. 8 is an illustrative view of measurement in a standard mode.

A conventional CNC image measuring machine comprises a measurement stage, which is moved relative to an imaging means such as a CCD camera and stopped at a measurement position as shown in FIG. 8. Then, the amount of illuminating light is adjusted to acquire image information about a measuring object. To the acquired image information, image processing such as setting of a measuring tool and edge detection is applied, thereby executing a measurement at one measurement position. This measurement is repeated as Measurement 1, Measurement 2, . . . and so on for all measurement positions to achieve measurements at required positions (hereinafter, such the measurement mode is referred to as a "standard measurement mode").

Figure 9:
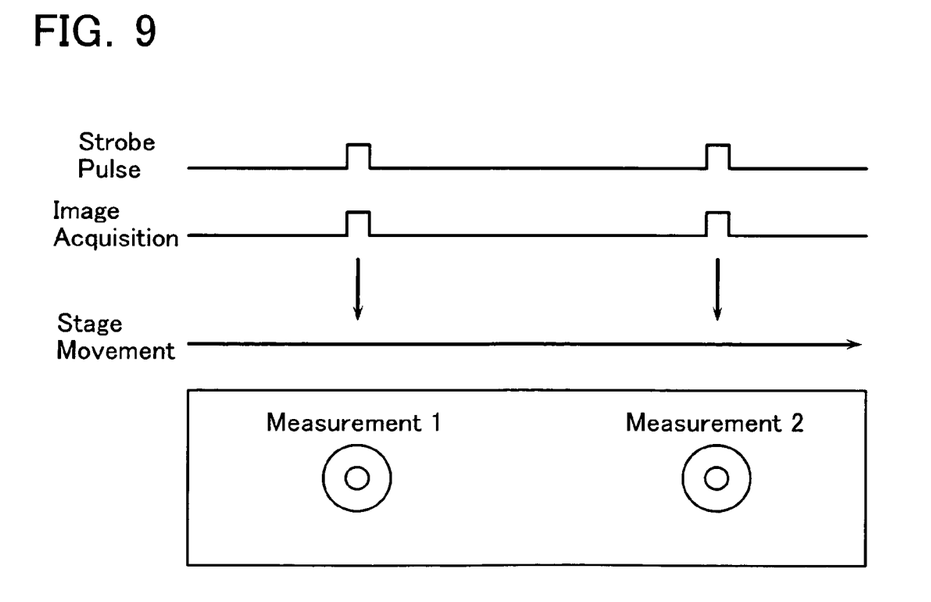
FIG. 9 is an illustrative view of measurement in a non-stop measurement mode.

In contrast, for the purpose of improving the throughput of measurement, a measurement may be performed without making a stop of the measurement stage relative to the imaging means even at a measurement position in a measurement mode (hereinafter, such the measurement mode is referred to as a "non-stop measurement mode"). An image measuring machine having such the non-stop measurement mode has been proposed (see JP-A2004-535587, paragraphs 0005-0006, FIG. 2). This image measuring machine irradiates the measuring object with strobe illumination, as shown in FIG. 9, without making a stop of the measurement stage at measurement positions. Alternatively, it captures instantaneous image information imaged using a shuttered CCD camera, for image measurement. In the non-stop measurement mode, when the relation between the movement speed of the stage and the strobe pulse width is appropriately set, a faster measurement can be achieved as an effect, without lowering the measurement accuracy much.

In the non-stop measurement mode, however, the wider the lightening pulse width of strobe illumination or the open duration of the shutter at the time of capturing the image information about the measuring object (hereinafter referred to as a "duration of capturing image information"), the larger the amount of movement of the stage at the time of image acquisition (the amount of shake of the acquired image) becomes. A larger amount of movement generally worsens the measurement accuracy. On the other hand, imaging the measuring object to acquire image information usable in measurement requires the quantity of illuminating light or the exposure time of the imaging means to be sufficient to a certain extent. From such the viewpoint, the duration of capturing image information should be set to have a necessary and sufficient value.

SUMMARY OF THE INVENTION

The present invention has been made in consideration of such the problems and has an object to provide an image measuring system, image measuring method, and image measuring program capable of achieving image measurements at excellent efficiency based on user-expected measurements.

To achieve the above object, the present invention provides a first image measuring method for image measurement by moving an imaging means relative to a measurement stage supporting a measuring object and capturing instantaneous image information about the measuring object at designated measurement positions without making a stop of the imaging means. The method comprises entering an instruction to select either a measurement accuracy prioritized mode or a measurement speed prioritized mode; executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed, if the measurement accuracy prioritized mode is selected; and executing processing for entering a relative movement speed of the imaging means to the measurement stage, and capturing the image information at the entered relative movement speed, if the measurement speed prioritized mode is designated.

The present invention provides a second image measuring method for image measurement by moving an imaging means relative to a measurement stage supporting a measuring object and capturing instantaneous image information about the measuring object at designated measurement positions without making a stop of the imaging means. The method comprises executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed.

The present invention provides a third image measuring method for image measurement by moving an imaging means relative to a measurement stage supporting a measuring object and capturing instantaneous image information about the measuring object at designated measurement positions without making a stop of the imaging means. The method comprises executing processing for entering a relative movement speed of the imaging means to the measurement stage, calculating and displaying a measurement accuracy of the image measurement or amount of movement at the time of capturing images based on the entered relative movement speed, and capturing the image information at the entered speed.

The present invention provides a first image measuring system for image measurement by moving an imaging means relative to a measurement stage supporting a measuring object and capturing instantaneous image information about the measuring object at designated measurement positions without making a stop of the imaging means. The system comprises a means operative for entering an instruction to select either a measurement accuracy prioritized mode or a measurement speed prioritized mode; a means operative for executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed, if the measurement accuracy prioritized mode is selected; and a means operative for executing processing for entering a relative movement speed of the imaging means to the measurement stage, and capturing the image information at the entered relative movement speed, if the measurement speed prioritized mode is designated.

The present invention provides a second image measuring system for image measurement by moving an imaging means relative to a measurement stage supporting a measuring object and capturing instantaneous image information about the measuring object at designated measurement positions without making a stop of the imaging means. The system comprises a means operative for executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed.

The present invention provides a third image measuring system for image measurement by moving an imaging means relative to a measurement stage supporting a measuring object and capturing instantaneous image information about the measuring object at designated measurement positions without making a stop of the imaging means. The system comprises a means operative for executing processing for entering a relative movement speed of the imaging means to the measurement stage, calculating and displaying a measurement accuracy of the image measurement or amount of movement at the time of capturing images based on the entered relative movement speed, and capturing the image information at the entered speed.

The present invention provides a first image measuring program for instructing a computer to execute image measurement by moving an imaging means relative to a measurement stage supporting a measuring object and capturing instantaneous image information about the measuring object at designated measurement positions without making a stop of the imaging means. The program comprises steps of entering an instruction to select either a measurement accuracy prioritized mode or a measurement speed prioritized mode; executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed, if the measurement accuracy prioritized mode is selected; and executing processing for entering a relative movement speed of the imaging means to the measurement stage, and capturing the image information at the entered relative movement speed, if the measurement speed prioritized mode is designated.

The present invention provides a second image measuring program for instructing a computer to execute image measurement by moving an imaging means relative to a measurement stage supporting a measuring object and capturing instantaneous image information about the measuring object at designated measurement positions without making a stop of the imaging means. The program comprising steps of executing processing for entering a tolerable measurement accuracy or amount of movement at the time of capturing images, calculating a relative movement speed of the imaging means to the measurement stage based on the entered measurement accuracy or amount of movement, and capturing the image information at a speed lower than the calculated relative movement speed.

The present invention provides a third image measuring program for instructing a computer to execute image measurement by moving an imaging means relative to a measurement stage supporting a measuring object and capturing instantaneous image information about the measuring object at designated measurement positions without making a stop of the imaging means. The program comprises steps of executing processing for entering a relative movement speed of the imaging means to the measurement stage, calculating and displaying a measurement accuracy of the image measurement or amount of movement at the time of capturing images based on the entered relative movement speed, and capturing the image information at the entered speed.

In the first and second image measuring methods, the first and second image measuring systems, and the first and second image measuring program according to the present invention, a tolerable measurement accuracy or amount of movement at the time of capturing images is entered. Then, from the entered measurement accuracy or amount of movement, a relative movement speed of the imaging means to the measurement stage is calculated. In addition, image information is captured at a speed lower than the calculated relative movement speed. This is therefore effective to perform an efficient measurement without falling short of desired measurement accuracy.

In the third image measuring method, the third image measuring system, and the third image measuring program according to the present invention, processing for entering a relative movement speed of the imaging means to the measurement stage is executed. Then, from the entered relative movement speed, a measurement accuracy of the image measurement or amount of movement at the time of capturing images is calculated and displayed. Accordingly, it is possible to determine from the measurement accuracy whether the designated relative movement speed is appropriate or not. This is effective to perform an efficient measurement without falling short of desired measurement accuracy.

BRIEF DESCRIPTION OF THE DRAWINGS

Preferred embodiments of the present invention will now be described below with reference to the accompanying drawings, in which.

DETAILED DESCRIPTION OF THE INVENTION

Embodiments of the present invention will be described next based on the accompanying drawings.

Figure 1:
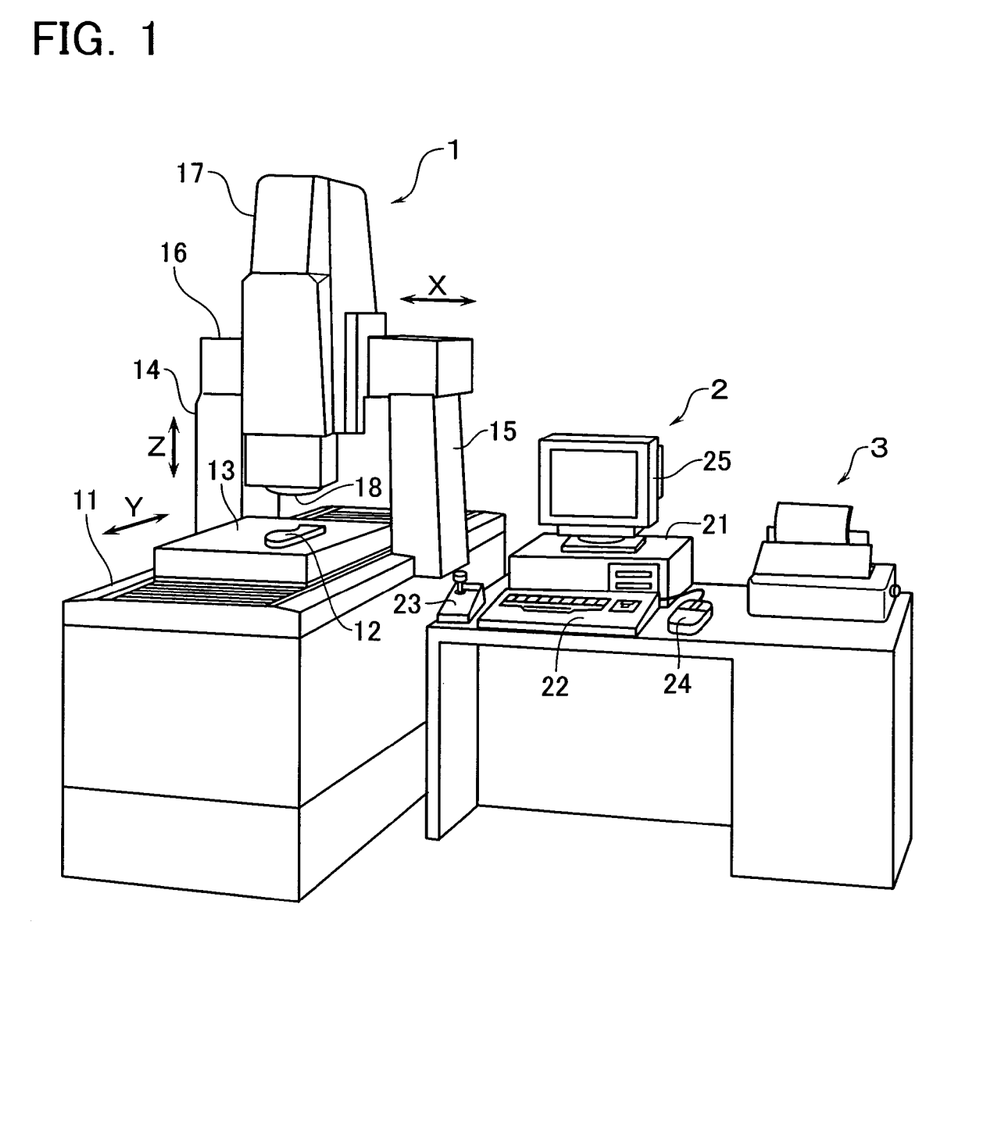
FIG. 1 is an external perspective view showing a configuration of an image measuring system according to an embodiment of the present invention.

FIG. 1 is a perspective view showing an entire configuration of an image measuring system according to an embodiment of the present invention. This system comprises a non-contact image measuring machine 1, a computer system 2 operative to drive/control the image measuring machine 1 and execute required data processing, and a printer 3 operative to print out a measurement result.

The image measuring machine 1 is configured as follows. A table 11 is provided and a measurement stage 13 is installed thereon to receive a measuring object (hereinafter referred to as a work) 12 mounted thereon. The measurement stage 13 is driven in the Y-axis direction by a Y-axis drive mechanism, not shown. Fixed at the central portion between both edges of the table 11 are support arms 14, 15 extending upward. An X-axis guide 16 is fixed to the support arms 14, 15 to link both upper ends thereof. An imaging unit 17 is supported on the X-axis guide 16. The imaging unit 17 is driven along the X-axis guide 16 by an X-axis drive mechanism, not shown. A CCD camera 18 is installed on a lower end of the imaging unit 17 as opposed to the measurement stage 13. The imaging unit 17 contains an illuminator and a focusing mechanism, not shown, as well as a Z-axis drive mechanism operative to shift the position of the CCD camera 18 in the Z-axis direction.

Figure 2:
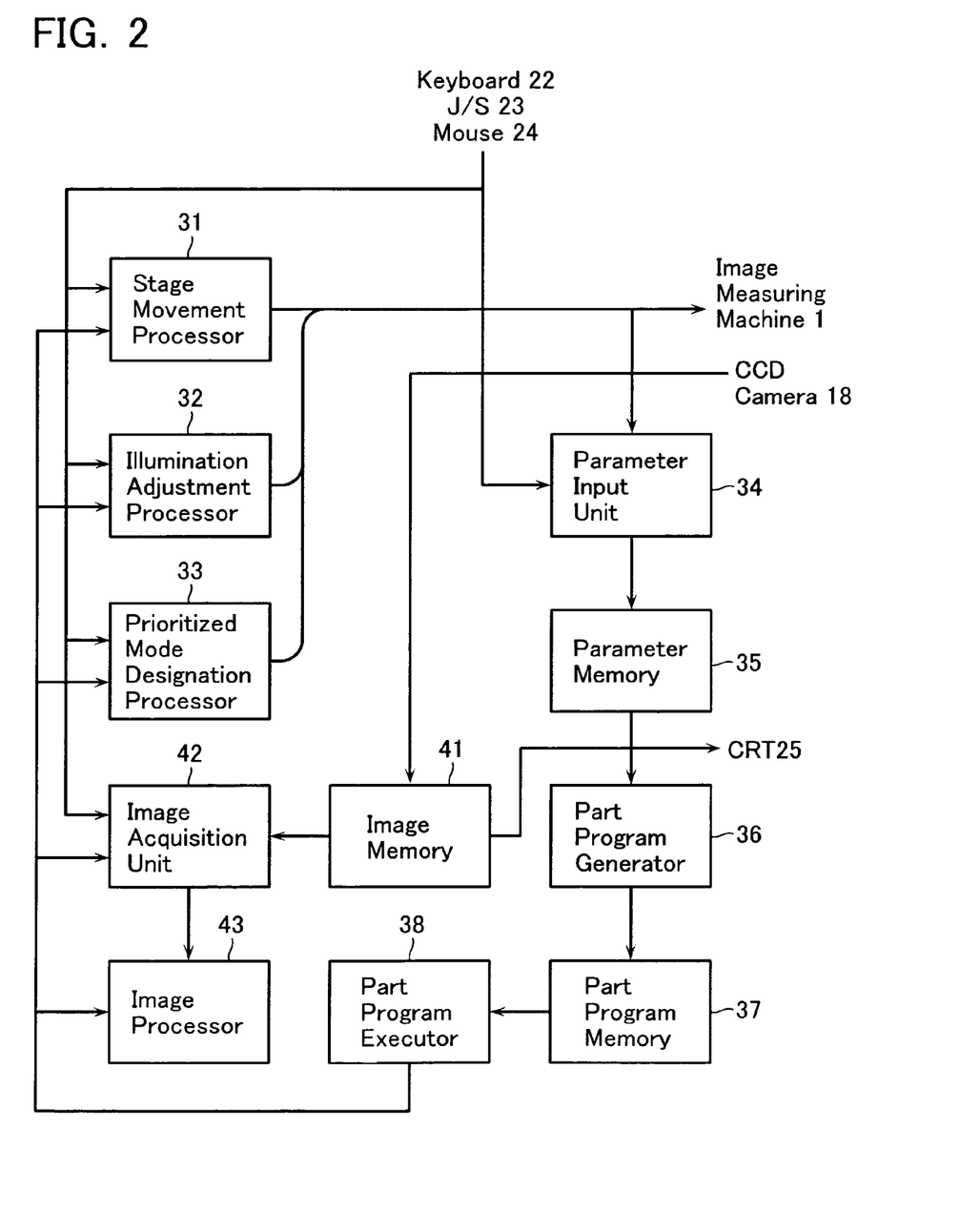
FIG. 2 is a functional block diagram of a computer in the same system.

The computer system 2 includes a computer body 21, a keyboard 22, a joystick box (hereinafter referred to as J/S) 23, a mouse 24, and a display unit 25. The computer body 21 realizes various functions as shown in FIG. 2 together with certain programs stored therein.

It includes a stage movement processor 31 for controlling the image measuring machine 1 based on an instruction input from input means such as the keyboard 22, the J/S 23 and the mouse 24; an illumination adjustment processor 32; and a prioritized mode designation processor 33. The stage movement processor 31 controls the XYZ-axes drive mechanisms in the image measuring machine 1 based on a stage movement instruction input from input means to shift the position of the CCD camera1 18 relative to the measurement stage 13. At the time of teaching, the illumination adjustment processor 32 flashes the illuminator in the image measuring machine 1 as a strobe light at a certain cycle successively and adjusts the pulse width of the strobe light based on an illumination adjustment instruction input from input means. In a non-stop measurement mode, it flashes the strobe light with a predetermined pulse width at designated measurement positions. The prioritized mode designation processor 33 executes processing for allowing the user to selectively instruct either a measurement accuracy prioritized mode or a measurement speed prioritized mode. In addition, it executes processing for allowing the user to enter information required in the designated modes, and executes processing for calculating the stage movement speed and so forth based on the entered information.

The stage position, the information about the pulse width of the strobe light and the prioritized mode designation information adjusted at the processors 31-33 are fetched into a parameter input unit 34 based on a certain instruction input from input means. The parameter fetched in the parameter input unit 34 is stored in a parameter memory 35. A part program generator 36 uses the parameter stored in the parameter memory 35 to generate a part program for measurement. The generated part program is stored in a part program memory 37.

A part program executor 38 is operative to read a required part program out of the part program memory 37 and execute it. In accordance with various commands described in the part program, the part program executor 38 drives the stage movement processor 31, the illumination adjustment processor 32, the prioritized mode designation processor 33, an image acquisition unit 42 and an image processor 43 appropriately. The pieces of image information imaged at the CCD camera 18 are sequentially stored in an image memory 41. The pieces of image information stored in image memory 41 are sequentially displayed on the display unit 25 and captured by the image acquisition unit 42 as still images based on the part program. To the image information acquired at the image acquisition unit 42, the image processor 43 executes image processing for image measurement, such as setting of a measuring tool, detection of edges, and detection of coordinates.

A measurement operation of the image measuring system according to the embodiment thus configured is described next together with a prioritized mode designation method.

Figure 3:
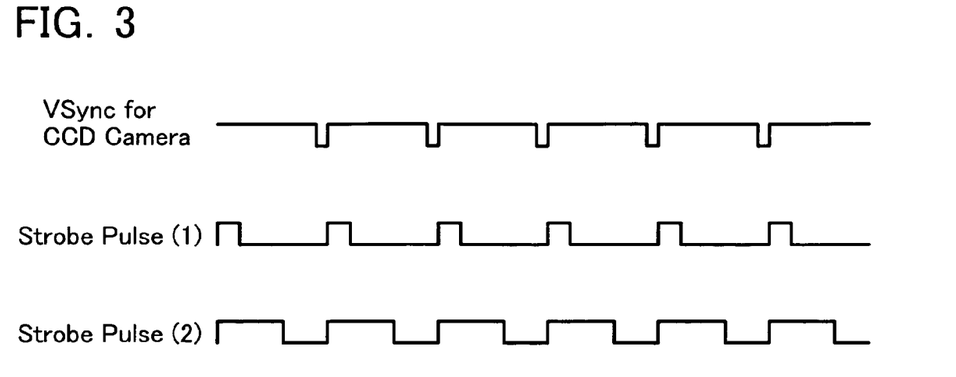
FIG. 3 is a waveform diagram illustrative of an illumination control method in the same system.

Prior to description of the prioritized mode designation method, an illumination control method is described first. FIG. 3 is a waveform diagram illustrative of the illumination control method. A strobe pulse for the illuminator may be generated in synchronization with a vertical synchronizing signal (VSync) for the CCD camera 18. When the pulse width is widened from (1) to (2), an image displayed on the display unit 25 is brightened as a whole. When the pulse width is narrowed from (2) to (1), an image displayed on the display unit 25 is darkened as a whole. In practical strobe illumination, one pulse with an adjusted pulse width is used.

Figure 4:
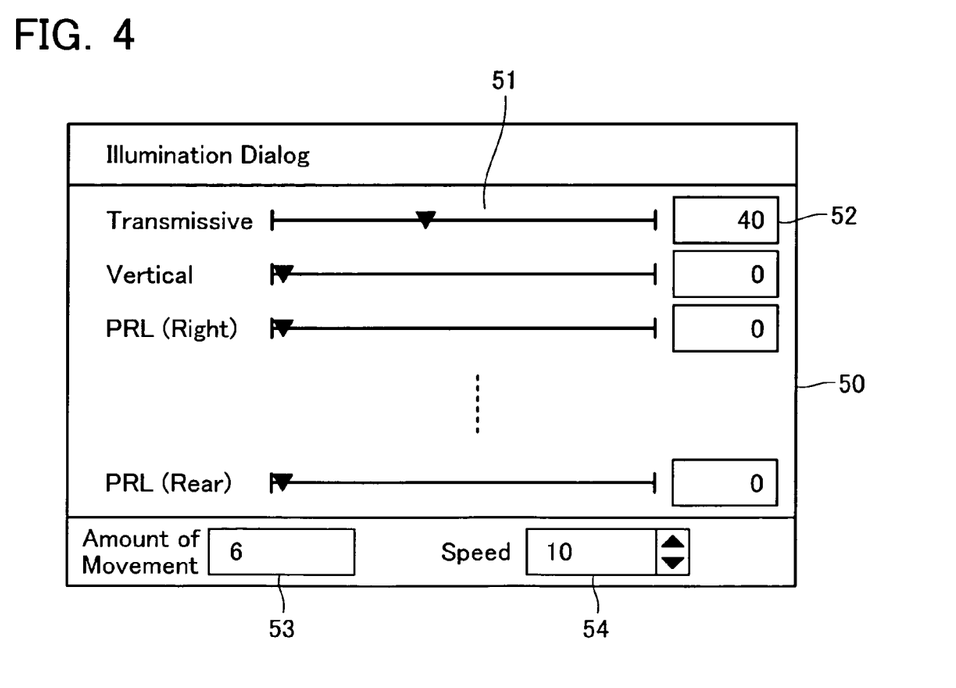
FIG. 4 shows an illumination dialog for illumination adjustment in the same system.

FIG. 4 shows an illumination dialog 50 for illumination adjustment. The pulse width may be subjected to dialog adjustment within 0-100% using sliders 51 corresponding to transmissive illumination, vertical illumination, and PRL (Programmable Ring Light) in the dialog 50 while confirming the image displayed on the display unit 25. Alternatively, it may be adjusted by entering a numeric value into an input box 52 and visually determining the most appropriate amount of light. The lower end of the dialog 50 is provided with boxes 53, 54 for the amount of movement d and the movement speed v described later. These boxes 53, 54 are described later. The strobe illumination may be emitted using an LED or a xenon lamp.

The lightening pulse width w of strobe illumination, the movement speed v of the measurement stage 13, the amount of movement (the mount of shake) d of the acquired image, the measurement accuracy a, and the brightness i of light irradiated to the work 12 can be represented by:

$$v = f_1(d/w)$$

$$d = f_2(v \cdot w)$$

$$a = g(d)$$

$$i = h(w) \qquad \text{[Expression 1]}$$

where $f_1(x)$, $f_2(x)$, $g(x)$, $h(x)$ each show a function of x.

As obvious from the above expression, the movement speed v of the measurement stage 13 can be determined when the tolerable amount of movement d and the lightening pulse width w are given. In this way, the amount of movement d (or the measurement accuracy a) is given as a set value to obtain a tolerable movement speed v of the measurement stage 13. Then, at a speed lower than the movement speed v, image information is captured for non-stop measurement operation. This mode is referred to as a "measurement accuracy prioritized mode".

In contrast, when the movement speed v of the measurement stage 13 is given, the amount of movement d can be derived from the relation with the lightening pulse width. In this way, the movement speed v of the measurement stage 13 is directly designated for non-stop measurement operation. This mode is referred to as a "measurement speed prioritized mode".

Figure 5:
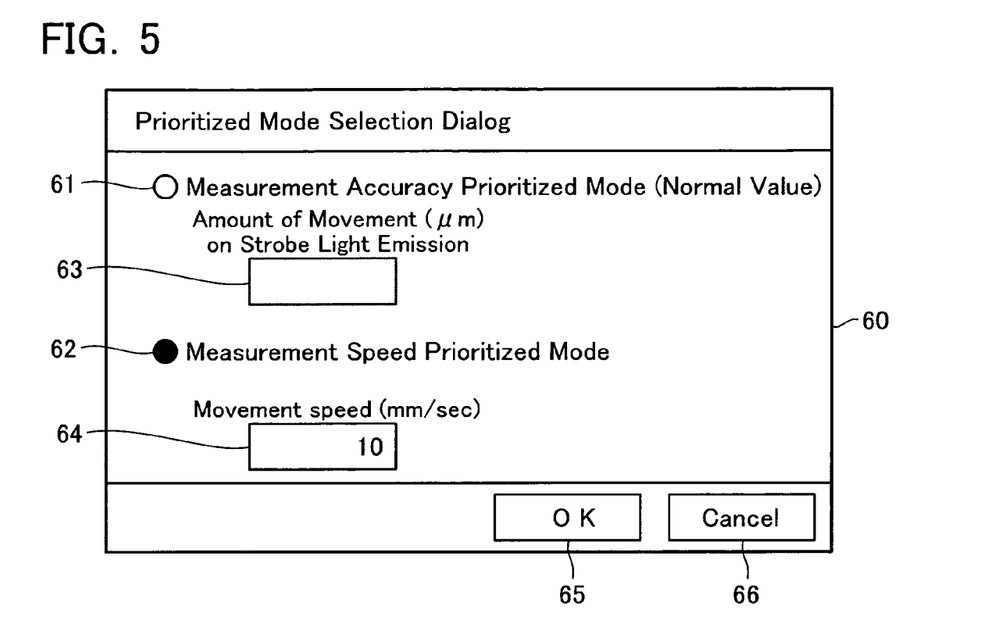
FIG. 5 shows a prioritized mode selection dialog in the same system.

A method of setting prioritized modes is described next. FIG. 5 shows a dialog for setting a prioritized mode according to an embodiment of the present invention.

This prioritized mode selection dialog 60 includes toggle switches 61, 62 for use in selection of the "measurement accuracy prioritized mode (normal value)" and the "measurement speed prioritized mode", input boxes 63, 64 provided beneath the toggle switches 61, 62, and "OK", "Cancel" buttons 65, 66.

Figure 6:
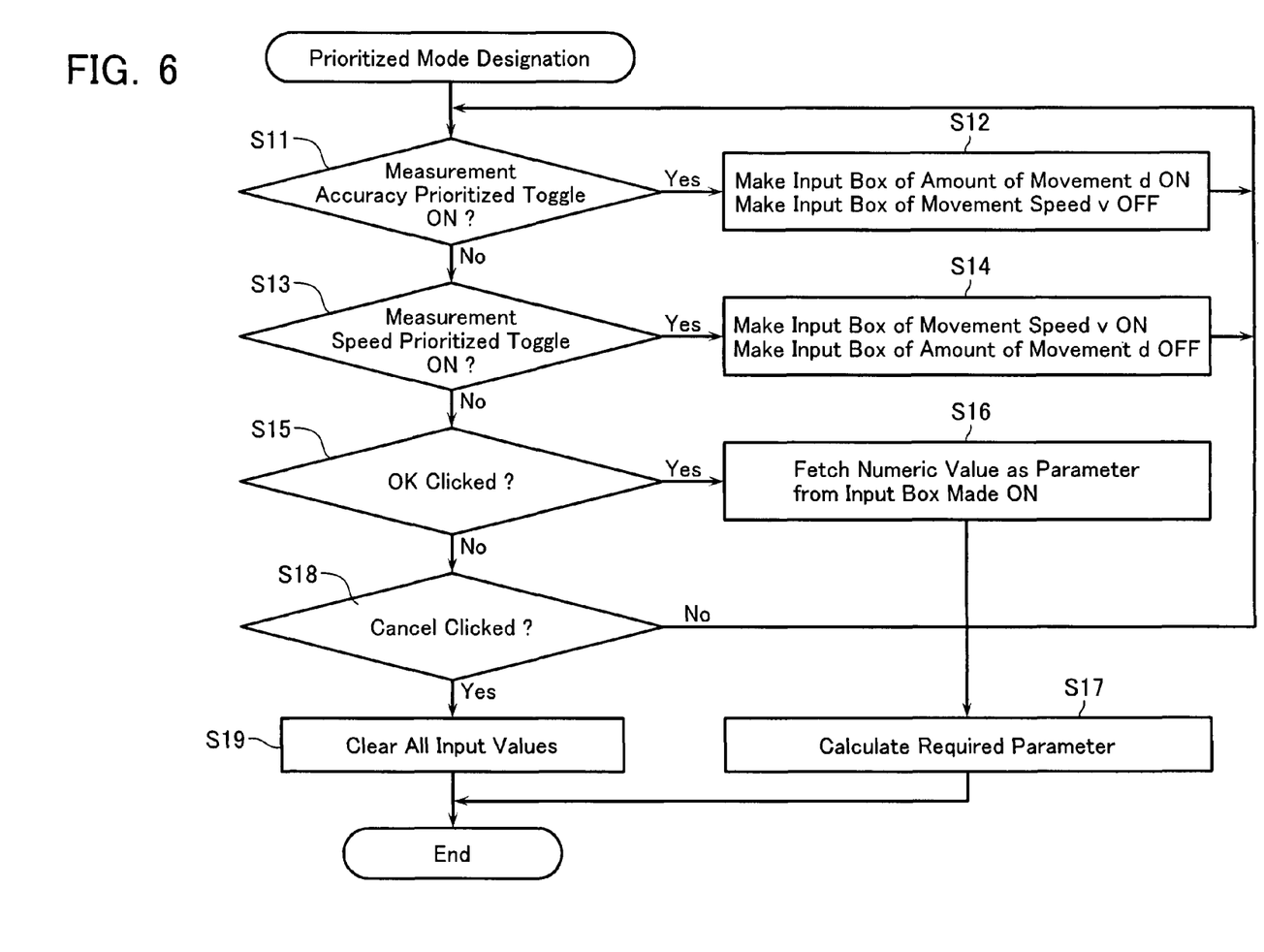
FIG. 6 is a flowchart showing processing of prioritized mode designation.

FIG. 6 is a flowchart showing the above-described processing of prioritized mode designation. First, checks are made on whether the toggle switch 61 for the measurement accuracy prioritized mode is switched from off to on, and whether the toggle switch 62 for the measurement speed prioritized mode is switched from off to on (S11, S13).

If the toggle switch 61 for the measurement accuracy prioritized mode is made on, the input box 63 of the amount of movement d is turned on (into the input-allowed state) and the input box 64 of the movement speed v is turned off (into the input-inhibited state). As a result, input for setting the amount of movement disallowed, and the user can enter a tolerable amount of movement d into the input box 63 for setting.

If the toggle switch 62 for the measurement speed prioritized mode is made on, the input box 63 of the amount of movement d is turned off (into the input-inhibited state) and the input box 64 of the movement speed v is turned on (into the input-allowed state). As a result, input for setting the movement speed v is allowed, and the user can enter a movement speed v into the input box 64 for setting.

Subsequently, it is determined whether the OK button 65 is clicked or not (S15). If the OK button 65 is clicked, the numeric value entered into the input box 63 or 64 with the toggle switch 61 or 62 made on is fetched at the parameter input unit 34 as a parameter (S16). On the basis of the above Expression 1, the movement speed v is calculated from the fetched amount of movement d, or the amount of movement d is calculated from the fetched movement speed v (S17). Then, the control terminates the processing of prioritized mode designation.

On the other hand, if it is detected that the cancel button 66 is clicked instead of the OK button 65 (S18), all input values are cleared (S19), followed by terminating the processing.

Thus, in the system of the embodiment, within the prioritized mode selection dialog 60, either the measurement accuracy prioritized mode or the measurement speed prioritized mode is selected. If the measurement accuracy prioritized mode is selected, processing for entering the tolerable amount of movement d is executed. Then, the relative movement speed v of the CCD camera 18 to the measurement stage 13 is calculated from the entered amount of movement d. Finally, image information is captured at a lower speed than the calculated relative movement speed v to execute image measurement. If the measurement speed prioritized mode is selected, processing for entering the relative movement speed v is executed, and the image information is captured at the entered relative movement speed to execute image measurement.

The boxes 53, 54 in the illumination dialog 50 shown in FIG. 4 are configured to display the amount of movement d and the movement speed v entered or calculated. Thus, the illumination adjustment can be allowed with reference to these values as well and in consideration of a balance between the brightness and the measurement accuracy. In this case, if parameters allowed to be input in the currently selected mode may be adjusted also in the illumination dialog 50 for plural illuminations of transmissive, vertical and PRL types, the illumination adjustment can be made much easier. In the shown example, the measurement speed prioritized mode is selected in the prioritized mode selection dialog 60. Accordingly, the movement speed v can be adjusted in the box 54 also in the illumination dialog 50 in this example. In this case, the amount of movement d can be calculated from the movement speed v and the lightening pulse width w and displayed on the box 53 but can not be adjusted directly. If the measurement accuracy prioritized mode is selected, the box 53 can be adjusted and the box 54 can not be adjusted.

The present invention is not limited to the above-described embodiment.

Figure 7:
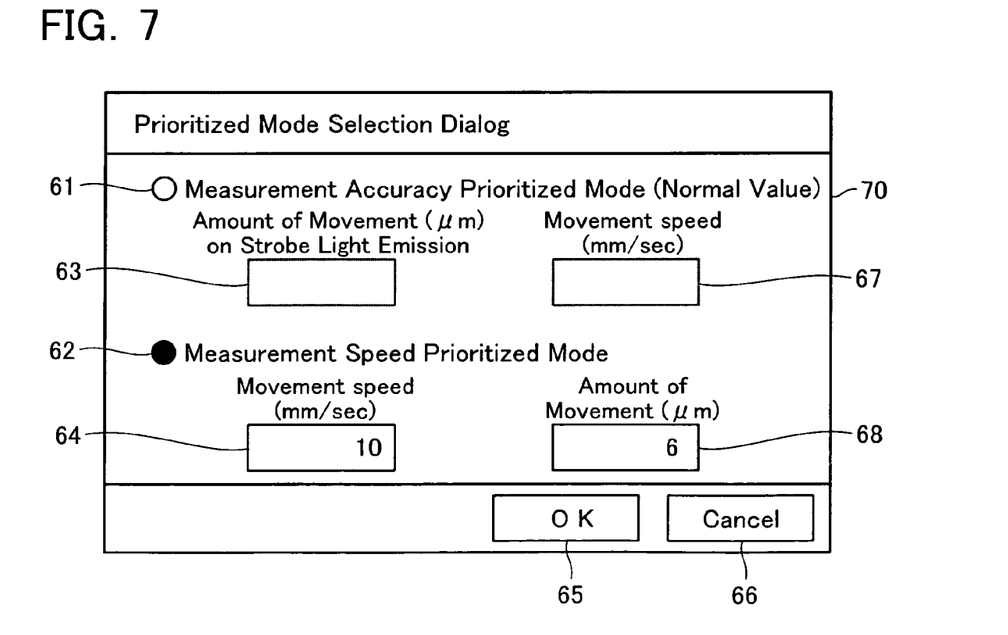
FIG. 7 shows a prioritized mode selection dialog in an image measuring system according to another embodiment of the present invention.

FIG. 7 shows a prioritized mode selection dialog 70 in an image measuring system according to another embodiment of the present invention.

In this embodiment, prioritized modes are provided with respective input boxes 63, 64 for entering parameters, together with respective display boxes 67, 68 for displaying parameters calculated from the entered parameters. When other parameters are displayed in this way, the input data can be determined appropriate or not, and the setting can be made much easier.

What is claimed is:

1. An image measuring method for image measurement by moving an imaging means relative to a measurement stage supporting a measuring object and capturing instantaneous image information about the measuring object at designated measurement positions without making a stop of the imaging means, the method comprising:
   displaying a first entering box configured to accept an instruction to select either a measurement accuracy prioritized mode or a measurement speed prioritized mode;
   displaying a second entering box configured to accept a tolerable measurement accuracy or amount of movement while the imaging means is capturing images, calculating a relative movement speed of the imaging means to the measurement stage based on the tolerable measurement accuracy or the amount of movement entered to the second entering box, and capturing the image information while moving the imaging means at a speed lower than the relative movement speed, if the measurement accuracy prioritized mode is selected by the first entering box; and
   displaying a third entering box configured to accept the relative movement speed of the imaging means to the measurement stage, and capturing the image information while moving the imaging means at the relative movement speed entered to the third entering box, if the measurement speed prioritized mode is selected by the first entering box,
   wherein the relative movement speed is defined as v, and is calculated in accordance with $v = f_1(d/w)$ (where $f_1(d/w)$ is a function of d/w),
   where w denotes a duration of capturing the image information, and d denotes the amount of movement while the imaging means is capturing the image information.

2. An image measuring apparatus for image measurement by moving an imaging means relative to a measurement stage supporting a measuring object and capturing instantaneous image information about the measuring object at designated measurement positions without making a stop of the imaging means, the apparatus comprising:

a means operative for displaying a first entering box configured to accept an instruction to select either a measurement accuracy prioritized mode or a measurement speed prioritized mode;

a means operative for displaying a second entering box configured to accept a tolerable measurement accuracy or amount of movement while the imaging means is capturing images, calculating a relative movement speed of the imaging means to the measurement stage based on the tolerable measurement accuracy or the amount of movement entered to the second entering box, and capturing the image information at a speed lower than the relative movement speed, if the measurement accuracy prioritized mode is selected by the first entering box; and a means operative for displaying a third entering box configured to accept the relative movement speed of the imaging means to the measurement stage, and capturing the image information while moving the imaging means at the relative movement speed entered to the third entering box, if the measurement speed prioritized mode is selected by the first entering box, wherein the relative movement speed is defined as v, and is calculated in accordance with $v = f_1(d/w)$ (where $f_1(d/w)$ is a function of $d/w$), where w denotes a duration of capturing the image information, and d denotes the amount of movement while the imaging means is capturing the image information.

* * * * *